United States Patent [19]

Kim et al.

[11] Patent Number: 5,258,486
[45] Date of Patent: Nov. 2, 1993

[54] SYNTHESIS OF BLOCK LIQUID CRYSTAL COPOLYMER

[75] Inventors: Ki-Soo Kim, Katonah, N.Y.; Sophia Dashevsky, Fair Lawn, N.J.; Jian-Lin Liu, Yorktown Heights; Stanley W. Palmaka, Yonkers, both of N.Y.

[73] Assignee: Akzo nv, Arnhem, Netherlands

[21] Appl. No.: 923,691

[22] Filed: Jul. 31, 1992

[51] Int. Cl.$^5$ .................... C08G 63/06; C08G 63/02; C08G 63/18; C08G 20/00
[52] U.S. Cl. .................... 528/206; 525/437; 525/444; 528/193; 528/194; 528/271; 528/272
[58] Field of Search ............ 528/206, 193, 194, 271, 528/272; 525/437, 444

[56] References Cited

FOREIGN PATENT DOCUMENTS 3103431  4/1991  Japan .

OTHER PUBLICATIONS

Ober et al., "Polymer Journal," vol. 14, No. 1, pp. 9-17 (1982).

Yoo et al., "Journal of Appl. Pol. Sci.," vol. 35 1201-1212 (1988).

Jung-Il Jin, et al. "Journ. of Pol. Sci" vol. 28, 531-543 (1990).

*Primary Examiner*—John Kight, III
*Assistant Examiner*—T. Mosley
*Attorney, Agent, or Firm*—Richard P. Fennelly; Louis A. Morris

[57] ABSTRACT

A single reactor process for formation of block copolymers comprising aromatic ester mesogenic units containing flexible alkane spacers and polyester flexible coil units in the main chain thereof which comprises reacting an $\alpha,\omega$-bis(hydroxybenzoyloxy) alkane monomer with an aromatic acid chloride in the presence of a functionalized flexible coil oligomer under temperature conditions in which an acid chloride-terminated bis(hydroxyalkyl terephthalate) oligomer was first formed at a first, lower temperature and the block copolymer was then formed at a second, higher temperature by reacting this oligomer with the functionalized flexible coil oligomer.

10 Claims, No Drawings

SYNTHESIS OF BLOCK LIQUID CRYSTAL COPOLYMER

BACKGROUND OF THE INVENTION

C. Ober et al. in Polymer Journal, Vol. 14, No. 1, pp. 9–17 (1982) disclose liquid crystal polymers comprising aromatic ester mesogenic units containing flexible alkylene (or "polymethylene") spacers. For example, one type contains an aromatic ester triad with three linearly-aligned aromatic rings, the bis(p-carboxyphenyl) terephthalate moiety, and a polymethylene flexible spacer which can contain 2 to 10 $CH_2$ groups.

Quite recently, in U.S. Ser. No. 726,601, filed Jul. 8, 1991, which is incorporated herein by reference, thermotropic liquid crystal segmented block copolymers containing mesogenic and flexible coil polymer blocks have been described in which the rod blocks can be the type of liquid crystal polymer moieties described in the Ober et al. publication with the flexible coil moieties being polyester, for example. The synthesis procedure for making the block copolymers, in preferred embodiments, was a two-step reaction. In the first step, a hydroxyl-terminated aromatic mesogenic oligomer was synthesized from terephthaloyl chloride and the desired 1,4-bis(p-hydroxybenzoyloxy) alkane in one reactor and acid chloride-terminated polyester oligomers from terephthaloyl chloride and bis(4-hydroxyalkyl) terephthalate were synthesized in another reactor. In the second step both functionalized oligomers were combined to form the desired block copolymer. This procedure is more complicated than desired since it requires a transfer of one or both of the oligomers to complete the polymerization.

In U.S. Serial No. 779,477, filed Oct. 18, 1991, a single reactor process for formation of block copolymers comprising aromatic ester mesogenic units containing flexible polymethylene spacers and polyester flexible coil units in the main chain thereof was proposed which comprises:

(a) reacting an α,ω-bis(hydroxybenzoyloxy) alkane monomer with an aromatic acid chloride in a reactor to form a functionalized liquid crystal oligomer containing such mesogenic units; and (b) thereafter reacting the oligomer from (a) in the same reactor with either a subsequently added (i) polyester oligomer; or (ii) the reagents for synthesizing the polyester oligomer (i).

This process constituted an improvement over the type of process theretofore known for making the block copolymer.

DESCRIPTION OF THE INVENTION

The present invention involves a single pot reaction of α,ω-bis(hydroxybenzoyloxy) alkane monomer, aromatic acid chloride, and bis(4-hydroxyalkyl terephthalate) oligomer at a low enough temperature to first favor the formation of the acid chloride-terminated bis(4-hydroxyalkyl terephthalate) oligomers with the raising of the temperature to a higher temperature, e.g., in the range of from about 220° C. to about 230° C., to yield the desired block copolymer.

The α,ω-bis(hydroxybenzoyloxy) alkane monomer which has been previously been reacted with the aromatic acid chloride to form the oligomer reagent and which functions as a reagent in its own right in the present invention has the formula

where Ar is a phenyl ring, n can vary from 2 to 10, preferably from 2 to 6, and all linkages to the phenyl rings are para.

The aromatic acid chloride which is used to form the oligomer and which is also an individual reagent is preferably terephthaloyl chloride.

In forming the oligomer reagent, the molar ratio of hydroxybenzoyloxy alkane monomer to acid chloride is selected so that a slight excess of either is used depending upon whether a hydroxy-terminated or chloride-terminated oligomer is desired. If a chloride-terminated mesogenic oligomer is desired a slight excess (e.g., 6 moles:5 moles) of acid chloride is used. If hydroxy termination is required, a slight excess of hydroxybenzoyloxy alkane-containing monomer is employed (e.g., 5 moles:4 moles).

The above step will yield an oligomer of the following structure

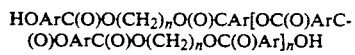

if a hydroxy-terminated species is desired.

This oligomer reacts with the aforementioned reagents to form the desired block copolymer. In the case of the former a diol of the formula

is used with terephthaloyl chloride. If the material from step (1) is hydroxy-terminated, a slight excess of acid chloride is added as a reagent in the second stage. Presence of chloride termination in the first stage oligomer requires a slight excess of the hydroxy reagent in step (2).

The process is further illustrated by the Examples which follow.

EXAMPLE 1

A block copolymer comprising a triad mesogen block unit containing a butylene spacer and a polybutylene terephthalate block was synthesized in a single reactor from a mixture of bis(4-hydroxybutyl terephthalate) oligomer (BHBT oligomer having a degree of polymerization of 6), 1,4-bis(p-hydroxybenzoyloxy) butane ("TR-4" monomer), and terephthaloyl chloride by first heating these reagents at 150°C.–160°C. for four to five hours and then at 220° C. to 230° C. for sixty to seventy hours. At the lower temperature range the formation of an acid chloride-terminated BHBT oligomer was favored because of the higher reactivity of the hydroxyl group of the oligomer reagent. At the higher temperature, the mesogen-containing blocks formed and the desired block copolymer was formed.

For example, TR-4 monomer (39.6 g, 0.12 mole), terephthaloyl chloride (29.2 g, 0.144 mole), BHBT oligomer (33.6 g, 0.024 mole), and 750 ml 1-chloronaphthalene were placed in a 1000 ml flask equipped with a stirrer and heated at 150° C.–160° C. under nitrogen for four hours. The temperature was then increased to 225°C and maintained for sixty-seven hours. After cooling, methanol (500 ml) was added, and the product was collected by filtration. The polymer was washed with acetone and was vacuum dried at 110° C. The yield was about 95% by weight. The polymer had an inherent viscosity of 0.51 dl/g in p-chlorophenol/tetrachloroethane (6/4 wt/wt) at 25° C., a melting point of 191° C. by differential scanning colorimetry (DSC), and a clearing temperature (by polarizing optical microscope) of greater than 340° C.

EXAMPLE 2

TR-4 monomer (3.8 g, $1.15 \times 10^{-2}$ mole), terephthaloyl chloride (2.8 g, $1.38 \times 10^{-2}$ mole), bis(4-hydroxyethyl terephthalate) oligomer (3.1 g, $2.3 \times 10^{-3}$ mole) and 40 ml 1-chloronaphthalene solvent were placed in a 100 ml flask equipped with a stirrer and were heated at 150° C. under nitrogen for five hours. The reaction temperature was then increased to 220°-230° C. and was maintained for additional seventy hours. After cooling, methanol (10 ml) was added to the reaction flask. The polymer was collected by filtration and was washed twice with 200 ml of hot acetone. The polymer was then vacuum dried at 110° C. for twenty-four hours. The yield was 95%. The product had an inherent viscosity of 0.244 dL/g in p-chlorophenol/TCE (6/4 wt/wt) at 25° C., a melting point of 220° C. by DSC and a clearing temperature (by polarizing optical microscope) of greater than 340° C.

The foregoing should not be construed in a limiting sense since only certain embodiments are taught thereby. The scope of protection sought is set forth in the claims which follow.

We claim:

1. A single reactor process for formation of a block copolymer comprising aromatic ester mesogenic units containing flexible alkane spacers and polyester flexible coil units in the main chain thereof which comprises reacting an α,ω-bis(hydroxybenzoyloxy) alkane monomer with an aromatic acid chloride in the presence of a functionalized flexible coil oligomer at a first lower temperature to favor the formation of an acid chloride-terminated bis(hydroxyalkyl) terephthalate oligomer and then at a second, higher temperature forming the mesogen-containing blocks and the block copolymer.

2. A process as claimed in claim 1 wherein the aromatic ester mesogenic units are of the formula —[OArC(O)O(CH$_2$)$_n$O(O)CArO(O)CArC(O)]— where Ar is phenylene and n is an integer of from about 2 to 10.

3. A process as claimed in claim 2 wherein n is 4.
4. A process as claimed in claim 2 wherein n is 2.
5. A process as claimed in claim 1 wherein the polyester flexible coil unit is of the formula —[O(CH$_2$)$_m$OC(O)ArC(O)O(CH$_2$)$_m$OC(O)ArC(O)]— wherein Ar is phenylene and m is from 2 to 6.

6. A process as claimed in claim 5 wherein m is 4.
7. A process as claimed in claim 5 wherein m is 2.
8. A process as claimed in claim 2 wherein the polyester flexible coil unit is of the formula —[—O(CH$_2$)$_m$OC(O)ArC(O)O(CH$_2$)$_m$OC(O)ArC(O)—]— wherein Ar is phenylene and m is from 2 to 6.

9. A process as claimed in claim 8 wherein m is 4.
10. A process as claimed in claim 8 wherein m is 2.

* * * * *